United States Patent [19]
Squires et al.

[11] Patent Number: 6,016,979
[45] Date of Patent: Jan. 25, 2000

[54] SYSTEM FOR PROCESSING BIG REFUSE SUCH AS A SPRING-CONTAINING MATTRESS AND THE LIKE

[75] Inventors: Derek Murray Squires, Stratford-Upon-Avon, United Kingdom; Kanichi Saito; Shinji Otuji, both of Shiga, Japan

[73] Assignees: Integrated Recycling Systems Ltd., Redditch, United Kingdom; Fuji Car MFG. Co., Ltd., Osaka, Japan

[21] Appl. No.: 08/855,998

[22] Filed: May 14, 1997

[30] Foreign Application Priority Data

Apr. 18, 1997 [JP] Japan ................................. 9-101631

[51] Int. Cl.[7] ........................ B02C 13/09; B02C 13/286
[52] U.S. Cl. ......................... 241/35; 241/280; 241/294; 241/DIG. 38
[58] Field of Search ..................... 241/79.1, 280, 241/281, 282, 294, DIG. 38, 35

[56] References Cited

U.S. PATENT DOCUMENTS

| | | | |
|---|---|---|---|
| 4,219,291 | 8/1980 | Hoeh | 407/31 |
| 4,801,101 | 1/1989 | Dreyer et al. | 241/240 |
| 4,874,134 | 10/1989 | Wiens | 241/19 |
| 5,184,780 | 2/1993 | Wiens | 241/19 |
| 5,509,613 | 4/1996 | Page | 241/282 |
| 5,645,234 | 7/1997 | Del Zotto | 241/101.76 |

*Primary Examiner*—John M. Husar
*Attorney, Agent, or Firm*—Nikaido, Marmelstein, Murray & Oram LLP

[57] ABSTRACT

A system of processing big refuses such as spring-containing mattresses according to the present invention includes a crushing process for crushing big refuses such as spring-containing mattresses by a single axial crusher capable of crushing them into a certain particle size or less, a magnetic-force grading process for grading iron material by a magnetic-force grader from crushed pieces crushed in said crushing process, and a wind-force grading process for removing light-weight refuses such as fiber adhering to iron material graded in said magnetic-force grading process by a wind-force grader.

9 Claims, 10 Drawing Sheets

SYSTEM FOR PROCESSING BIG REFUSE SUCH AS A SPRING-CONTAINING MATTRESS AND THE LIKE

BACKGROUND OF THE INVENTION

1. Field of the Invention

The present invention relates to a system of processing big refuses, and more particularly to a system of processing big refuses suitable for processing spring-containing mattresses which have springs and the like inside thereof.

2. Prior Art

Heretofore, in the processing of mattresses which have coil shaped springs inside thereof, a cutter, called generally of a guillotine type, has been used whose crushing blade moves up and down to cut them with respect to its stationary blade, whereby spring-containing mattresses have been cut into strip-of-paper like substances with a certain width by the guillotine type cutter, and the cut substances as they are have been incinerated in a incinerator.

However, the substances cut by such a cutter are large in cutting size and difficult to handle their processing work.

Also, the method is such that the cut substances are incinerated in a condition in that they still have springs inside thereof, so that after incineration, springs have remained in an incinerator to cause the facility in the incinerator to be damaged, thus having made the processing work extremely troublesome.

Now, as a system of processing general big refuses and the like, the one as shown in FIG. 10 is well known. The system shown in FIG. 10 includes a crushing process for crushing big refuses by a crusher 1', an iron content removing process for removing only iron content of crushed pieces crushed in the crushing process by a magnetic-force grader 2, a light-weight combustibles removing process for removing light-weight combustibles by a wind-force grader 3 from residuals remaining after removing iron content in the iron content removing process, a particle-size grading process for grading residuals remaining after removing light-weight combustibles in the light-weight combustibles removing process by a particle-size grader 4 into certain particle sizes, and a nonferrous metal removing process for removing nonferrous metals such as aluminum by a nonferrous metal grader 5 from residuals remaining after grading those with certain particle sizes in the particle-size grading process. In this system, as a crusher, the one of hammer type or biaxial shearing type has been employed. In FIG. 10, reference codes C1 through C7 designate conveyors with different length respectively; reference numeral 6, a cyclone for dropping light-weight combustibles degraded by the wind-force grader 3 onto the conveyor C6; reference numeral 7, a constant-volume feeder in which light-weight combustibles conveyed by the conveyor C6 are charged and which can discharge them by a constant volume; and reference numeral 8, a compression former for compressing light-weight combustibles discharged from the constant-volume feeder 7 and dropping them onto the conveyor C7 on the lower side. Numeral 9 designates a blower through which the flow of air stream is connected to the above-mentioned cyclone 6 and the wind-force grader 3 and which can feed air to the wind-force grader 3; and reference numeral 10, a bag filter.

Although with such a processing system for general big refuses, spring-containing mattresses can be also considered to be processed, the crushing size of the mattresses is too large to grade them in the following grading process in case of crushing them with the crusher of hammer type or biaxial shearing type. If these large crushed pieces are allowed to flow to the following grading process, a problem will occur that fiber and cotton caught by springs enter the crushed pieces.

On the other hand, as a crusher for crushing general big refuses, other than a biaxial crusher for performing crushing between two parallel crushing rotors of low-speed rotary type, a single axial crusher for performing crush between a single crushing rotor and a stationary blade has been known. As an example of the single axial crusher, there is the one proposed by the official gazette of Japanese Utility Model Application Kokoku HEI 5-29083. The single axial crusher disclosed in the official gazette is such that a spiral groove is formed on the outer periphery of a substantially cylindrical crushing rotor as a whole, that a plurality of stationary members at predetermined intervals are provided in the spiral groove, that the stationary members are detachably mounted with cutting blades, that a supporting plate to place big refuses thereon is provided with stationary blades on the end face opposite to the crushing rotor, and that an urging member is movably disposed on the supporting plate. The urging member is provided forward/backward movably by the piston rod of a hydraulic cylinder.

However, the single axial crusher disclosed in the official gazette is of a type in that the stationary members for mounting detachably the cutting blades are secured along the spiral groove, so that when the capacity is attempted to increase in setting the crushing capacity, not only the number of cutting blades must be increased, but also the spiral pitch of the spiral grooves be changed. In addition, associated with the change of the spiral pitch, the shape of stationary blades must be also changed corresponding to the spiral pitch.

Accordingly, it is hardly possible to largely adjust the magnitude of the crushing capacity with the spiral pitch of spiral groove remaining the same. Only a narrow adjusting width can be provided.

Also, the crushing is only a primary crushing by the cutting blades, and no consideration to a secondary crushing for more fine crushing is given, so that subjects to be crushed, once crushed, may be discharged as they are, thus making the crushed particle size ununiform.

For this reason, the present invention is made in view of the above-mentioned conventional problems, and it is an object of the invention to provide a system of processing big refuses such as spring-containing mattresses which can solve troublesome problems associated with the processing of big refuses including iron material such as spring-containing mattresses, recover iron material at a high accuracy from big refuses, particularly recover springs at a high accuracy from spring-containing mattresses, and perform smoothly the following works.

SUMMARY OF THE INVENTION

That is, the means taken by the present invention to solve the above-mentioned problems are in that the means include a crushing process for crushing big refuses such as spring-containing mattresses by a single axial crusher capable of crushing them into a certain particle size or less, a magnetic-force grading process for grading iron material by a magnetic-force grader from crushed pieces crushed in the crushing process, and a wind-force grading process for removing light-weight refuses such as fiber adhering to iron material graded in the magnetic-force grading process by a wind-force grader.

Accordingly, in the system of processing big refuses characterized by the above-mentioned configuration, big refuses such as spring-containing mattresses including iron material such as coil springs and fiber such as cloth, cotton and sponge are first crushed by the single axial crusher into crushed pieces with a predetermined size or less. Then, the crushed pieces thus crushed are graded for iron material by the magnetic-force grader, and the iron material graded by the magnetic-force grader is collected by further removing cloth and the like adhering to the iron material by the wind-force grader. In other words, although fiber cut pieces such as cloth, cotton and sponge may adhere to the iron material graded by the magnetic-force grader, such adhering fiber can be also removed by the wind-force grader. In this way, the iron material is recovered as a pure iron material to which no fiber and the like adhere.

For this reason, this system is easier in processing operation than conventional, general processing systems, and can grade iron material at a high accuracy to collect.

Compared to the system of processing spring-containing mattresses by conventional guillotine-type cutting, this system can perform the processing of spring-containing mattresses extremely simply.

BRIEF DESCRIPTION OF THE DRAWINGS

FIG. 5A is a front sectional view; and FIG. 5B is a side sectional view.

FIG. 6A is a plan view; and FIG. 6B is a view taken along a line II—II of FIG. 6A.

DETAILED DESCRIPTION OF THE INVENTION

According to drawings, one embodiment of the present invention will be explained hereinafter, and particularly, the one intended for spring-containing mattresses as big refuses will be explained here.

Figure 1:
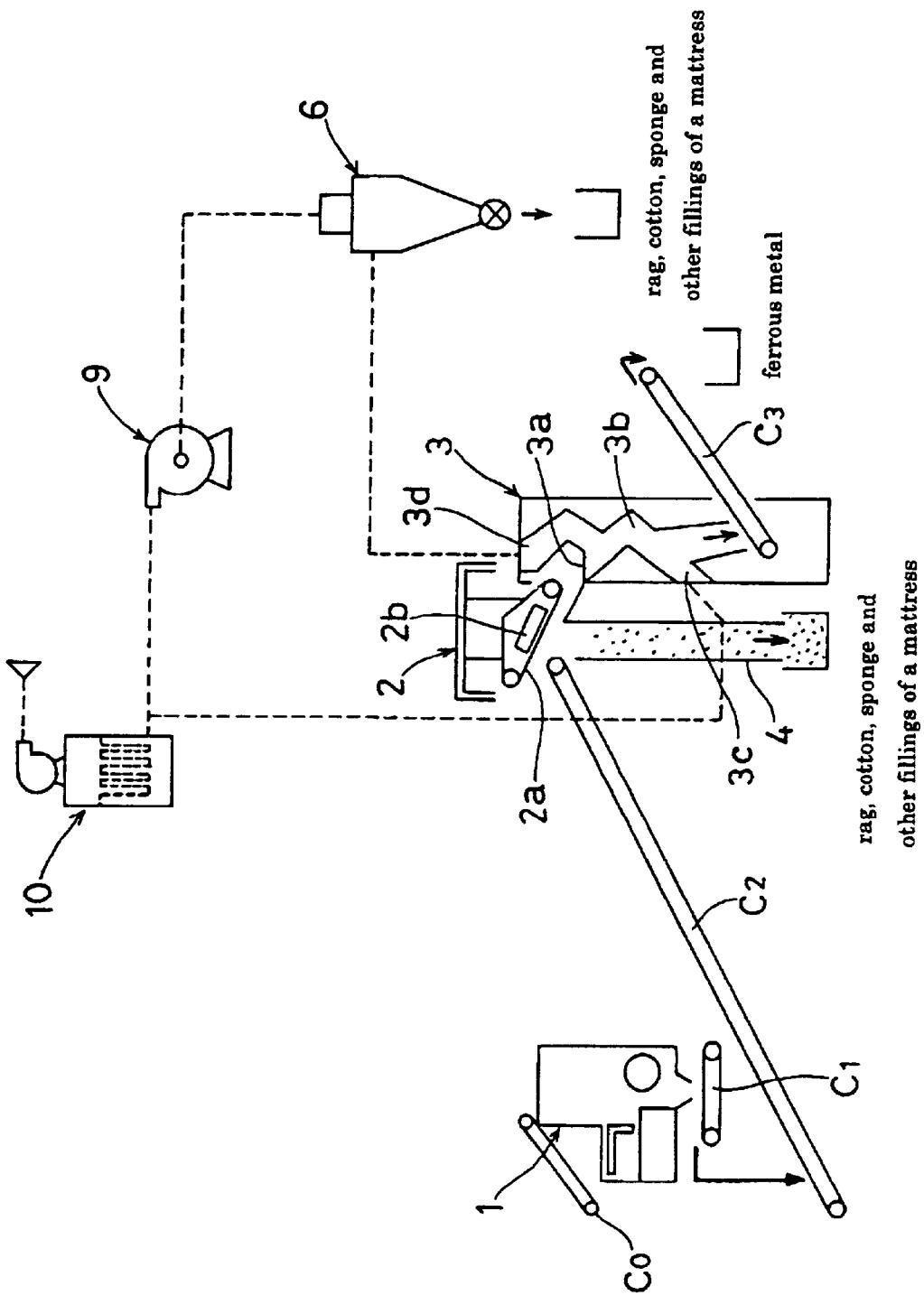
FIG. 1 is a general schematic view showing one embodiment of a system of processing big refuses in accordance with the present invention.

In FIG. 1, reference numeral 1 designates a single axis type crusher capable of crushing spring-containing mattresses into crushed pieces with certain particle sizes. The detail of the structure will be described later.

Reference code C0 designates a conveyor for charging spring-containing mattresses into the crusher.

Reference code C1 designates a conveyor onto which crushed pieces crushed by the crusher 1 are dropped.

Also, reference code C2 designates a conveyor for conveying the crushed pieces conveyed and dropped from the above-mentioned discharging conveyor C1 to the following process, a magnetic-force grading process. Further, the conveying conveyor C2 is configured such that it is inclined upward in the conveying direction to move the crushed pieces to the upper side.

The crushed pieces conveyed by the conveying conveyor C2 are attracted and removed for iron material by a magnetic-force grader 2. The magnetic-force grader 2 of this embodiment is hung on the upper side of the terminal end (the highest position) of the conveying conveyor C2. The magnetic-force grader 2 is configured such that the iron material attracted from the crushed pieces near the terminal end of the conveying conveyor C2 is, as it is attracted, then conveyed by a certain distance. Specifically, the magnetic-force grader 2 is configured such that it includes a turning and rotating rotary belt 2a and a magnet 2b in the rotary belt 2a. Such a magnetic-force grader itself is well known.

Also, provided on the lower side of the terminal end of the conveying conveyor C2 is a dust chute 4 within a certain distance by which iron material is conveyed by the above-mentioned magnetic-force grader 2. The dust chute 4, into which the crushed pieces not attracted by the magnetic-force grader 2 are dropped, accommodates light-weight refuses including fiber such as cloth, cotton and sponge.

Provided on the lower side of and directly below the terminal end of the rotary belt 2a of the above-mentioned magnetic-force grader 2 is a receiving port 3a of a wind-force grader 3. In other words, when the position near the terminal end of the rotary belt 2a is reached, the attracting force of the above-mentioned magnet 2b becomes weak, whereby the crushed pieces including attracted iron material are dropped, and thus the dropped crushed pieces are dropped into the receiving port 3a of the wind-force grader 3.

Now, the wind-force grader 3 is provided with a dropping portion 3b which is bent zigzagly at four places from the receiving port 3a. Connected to the lower side of the dropping portion 3b is an air sending path 3c to which air is sent from a suction blower 9, and connected to the straight line from the bent portion on the upper side of the dropping portion 3b is an air discharging path 3d. This allows the wind from the blower 9 to pass through the air sending path 3c in the dropping portion 3b in a direction opposite to that of dropping of the crushed pieces and reach the air discharging path 3d. With the wind having reached the air discharging path 3d, impurities are removed by a cyclone 6.

The wind from the blower 9 is partially sent to the wind-force grader 3 as described above, and remaining of the wind is sent through a bag filter 10 to the atmosphere. In this way, the wind from the blower 9 is separated, so that the wind force in the dropping portion 3b is adjusted. Now, the wind force in the dropping portion 3b of the wind-force grader 3 is set to a strength at which the wind does not fly the iron material of the crushed pieces upward, but can fly light-weight refuses such as fiber having adhered to the iron material.

Although not shown, the system of this embodiment including the crusher 1, the magnetic-force grader 2, the wind-force grader 3, the dust chute 4, the cyclone 6, the blower 9, the bag filer 10 and the conveyors C0, C1 and C2 is placed on a vehicle.

The above-mentioned crusher 1 will be explained in detail hereinafter.

Figure 2:
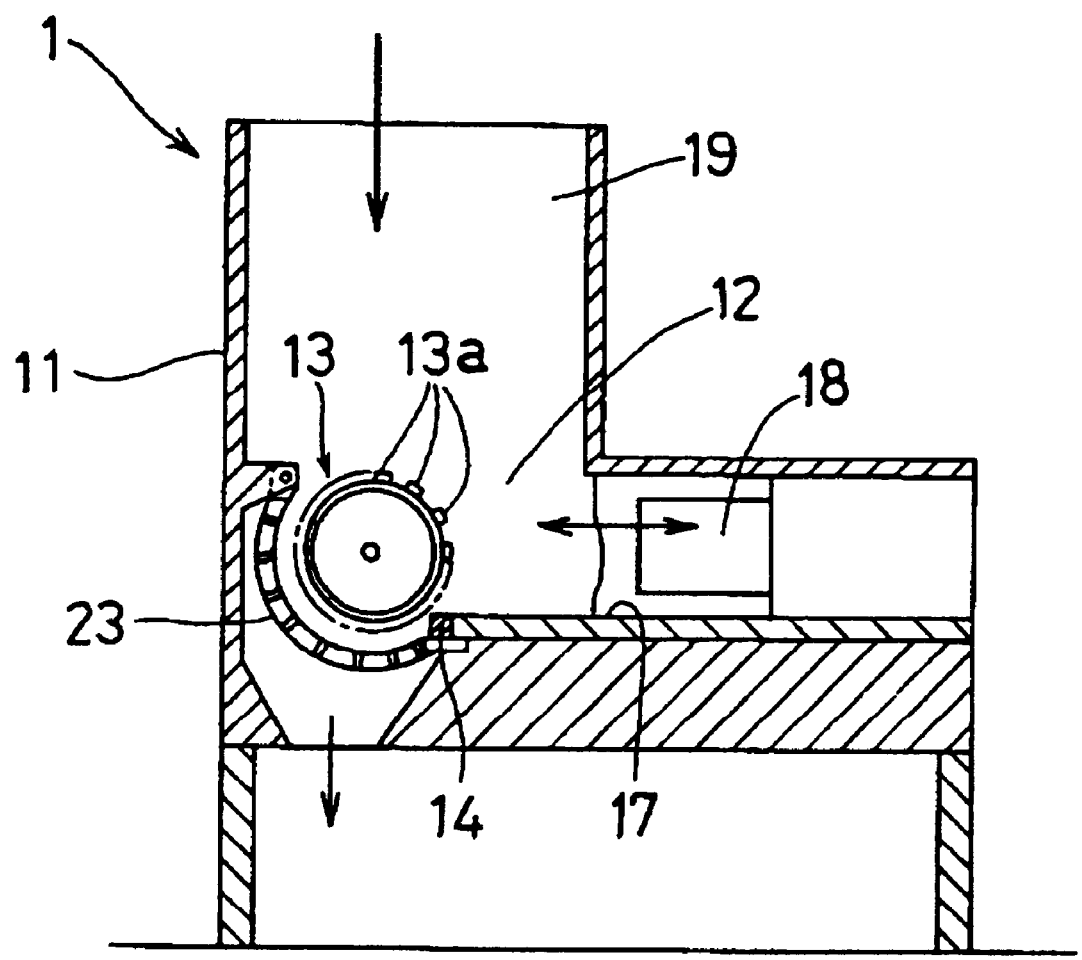
FIG. 2 is a schematic illustrative view including a partly sectional view when viewed from the side of a crusher in the system.

As shown in FIG. 2, the crusher 1 has a crushing chamber 12 provided inside a box-shaped frame 11 made of steel plate. Provided inside the crushing chamber 12 are a crushing rotor 13, a stationary blade 14, and a pusher 18, and included on the upper side of the chamber 12 is a hopper 19. Charged into the hopper 19 are spring-containing mattresses from the upper side by the above-mentioned charging conveyor C0.

Figure 5A:
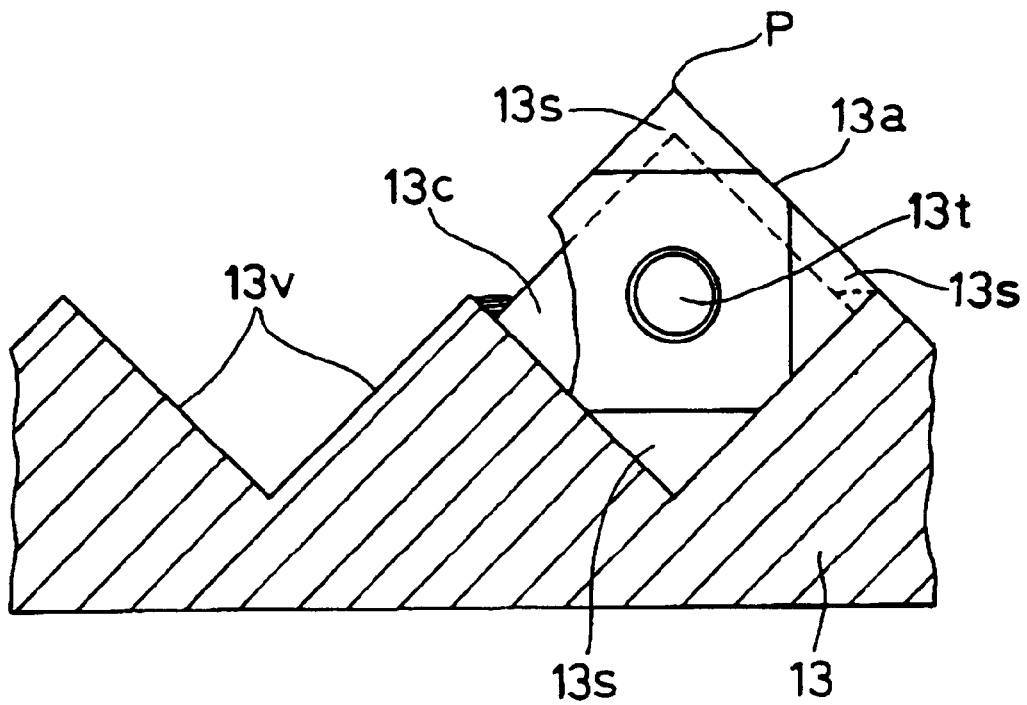
FIGS. 5A and 5B are detail views of a cutting blade of the crusher.

The crushing rotor 13 is formed into substantially cylindrical shape as a whole, and as shown in FIG. 5, formed on the outer peripheral surface are many circumferential grooves 13v with a V-letter shaped section in a manner to be adjacent to each other and parallel in the axial direction.

The circumferential grooves 13v are provided on the outer peripheral surface of the crushing rotor 13 in the direction transverse to the rotating shaft of the rotor 13.

Figure 5B:
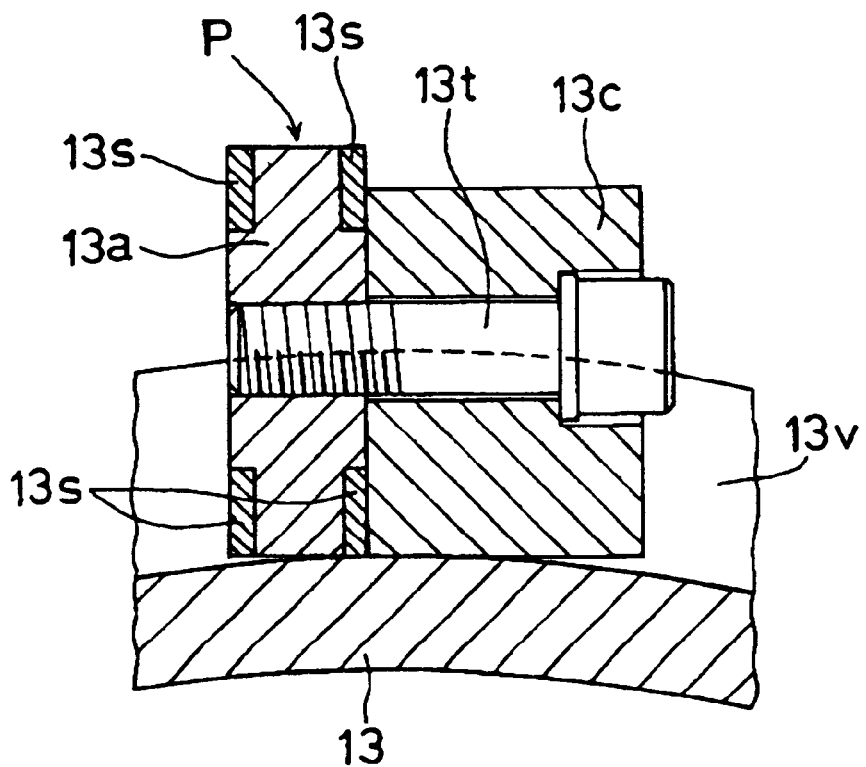

Welded and secured to the circumferential grooves 13v, as shown in FIG. 5B, are square-pillar-shaped blade fixing blocks 13c, each having the two faces in contact with the corresponding inclined face of the circumferential grooves 13v.

Inserted through the threaded hole on the center of the fixing block 13c is a bolt 13t, whereby a crushing blade 13a is detachably mounted. The number of the crushing blades 13a mounted to respective circumferential grooves 13v should be those as required depending on the required processing capacity of the crusher 1.

The crushing blade 13a has a square-pillar-shaped configuration similar to that of the fixing block 13c, and is mounted to the corresponding circumferential groove 13v with the two adjacent side faces in contact with the V-letter shaped surface of the circumferential groove 13v.

The crushing blade 13a mounted to the circumferential grooves 13v is in a condition in that the other two adjacent side faces protrude beyond the peripheral surface of the crushing rotor 13, and that the angle portion P at which the both side faces cross with each other protrudes highestly.

Further, embedded in the angle portion P at the four corners which hit the blade portion of the crushing blade 13a is a sheet of triangle-shaped cemented carbide material 13s which shares a portion of the two adjacent sides of each corner. Now, the cemented carbide materials 13s are embedded in the respective four corners on the surface and the respective four corners on the back, at eight places in total.

Figure 4:
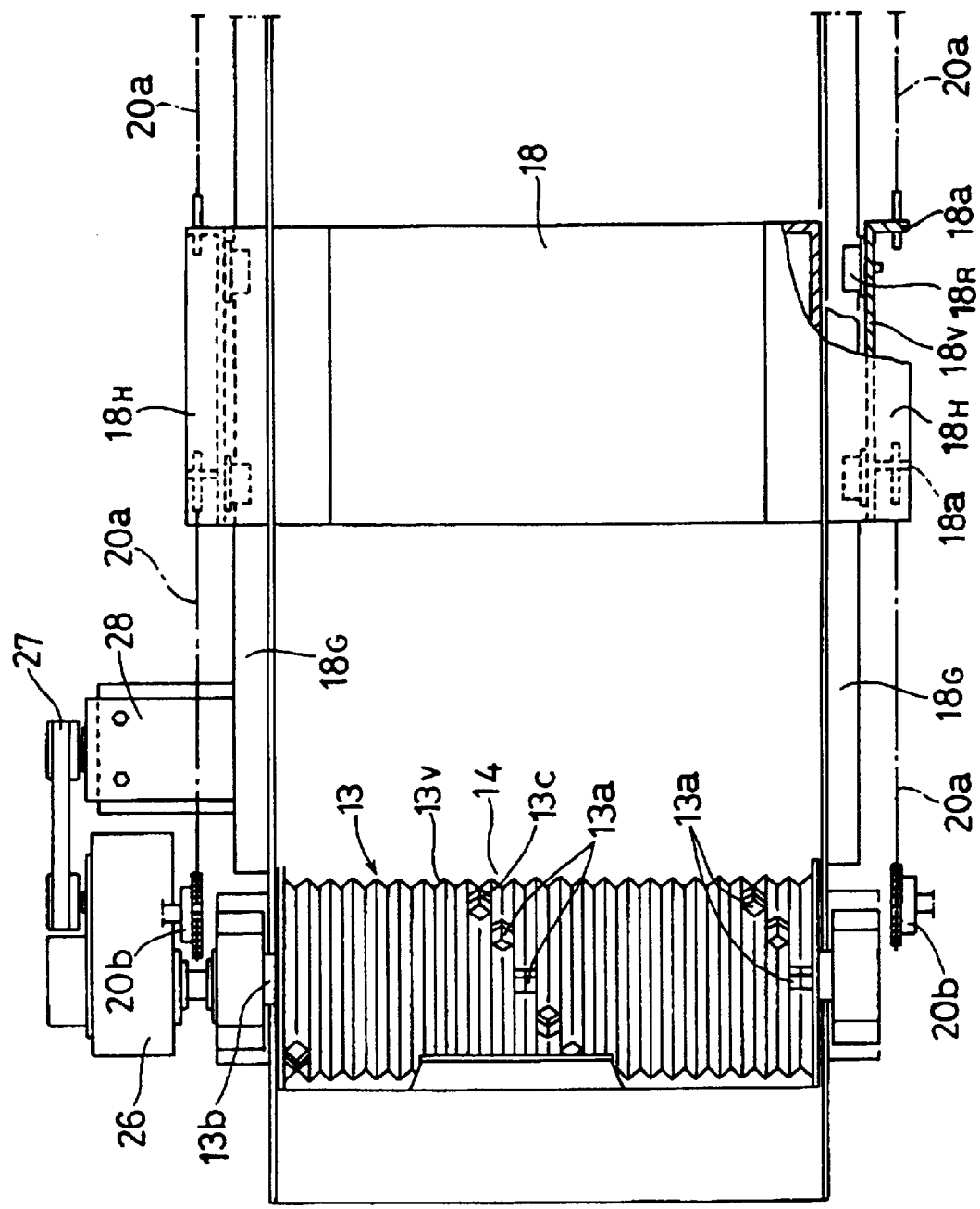
FIG. 4 is a partly omitted plan view of the crusher.

In an example shown in FIG. 4, the above-mentioned crushing blade 13a and fixing block 13c are mounted one by one thereof to respective circumferential grooves 13v, and disposed in a manner to be shifted in phase in the circumferential direction between adjacent circumferential grooves 13v, so that their phases are shifted in such a manner that the imaginary line connecting the protruded angle portions P of the above-mentioned crushing blade 13a becomes spiral. In this case, making the spiral pitch longer or shorter allows the required number of the crushing blades 13a to be changed.

Figure 6A:
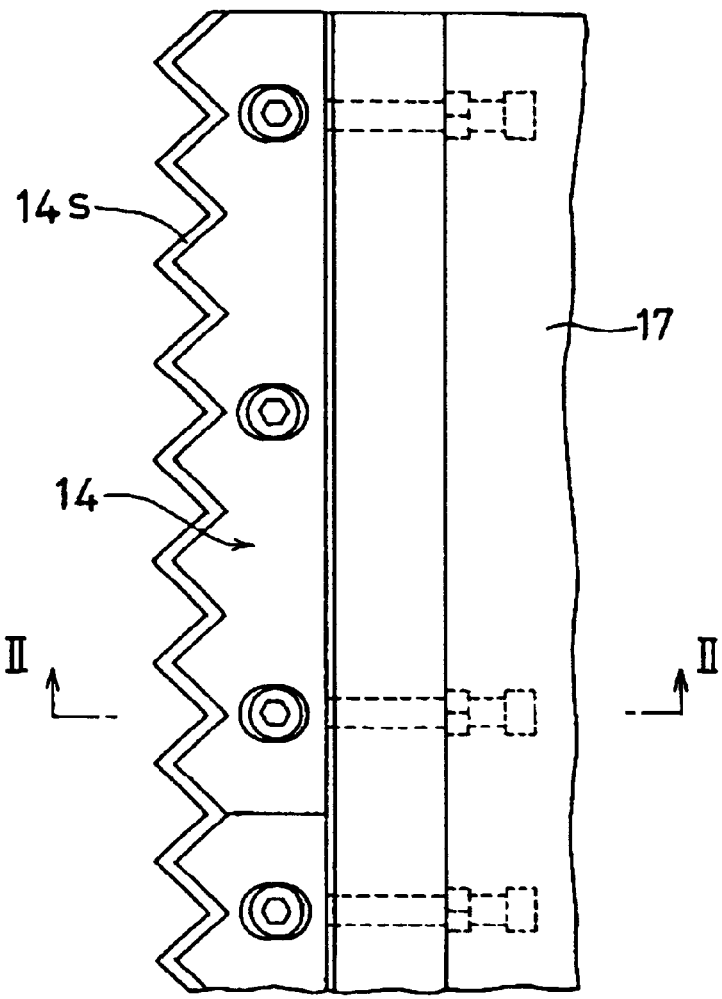
FIGS. 6A and 6B are detail views of a stationary blade of the crusher.
Figure 6B:
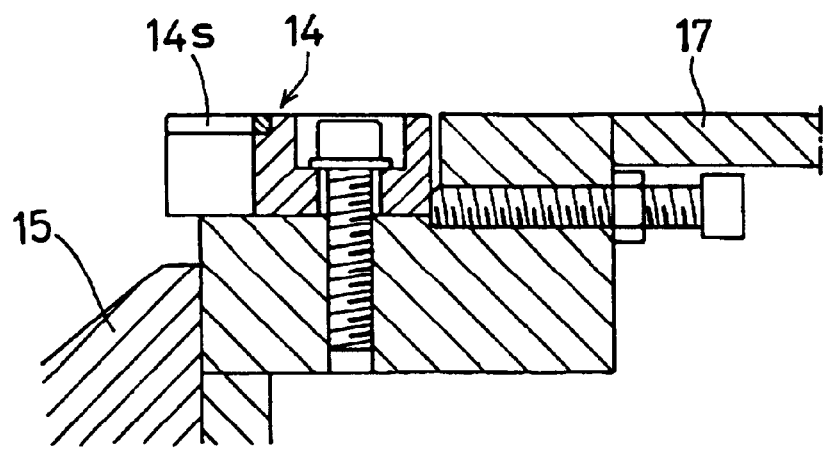

Provided on the outward side of the crushing rotor 13 is a supporting bed 17 connected and secured to a portion of the frame, and as shown in FIGS. 6A and 6B, provided at the end on the side on which an end thereof faces the crushing rotor 13 is the stationary blade 14. The stationary blade 14 is fixed to the supporting bed 17 by the use of bolts and the like, and is formed of many V-letter shaped groove blades which are provided continuously in serration near the side opposite to the crushing rotor 13.

The groove blades are provided opposite to the respective circumferential grooves 13v of the crushing rotor 13, and formed such that the shape thereof is made in such a manner that respective crushing blade 13a can pass a space between the groove between respective groove blades and the circumferential groove 13v opposite thereto so as to have a correlation with the two adjacent side faces of respective crushing blade 13a. As shown in FIG. 6A, embedded in the blade portion of the groove blades of the stationary blade 14 is a sheet cemented carbide material 14s along a required width from the serrate end face. In this way, the cemented carbide materials 14s and 13s superior in abrasion resistance to blades formed by normal tool steel are embedded in the stationary blade 14 and the blade portion of the above-mentioned crushing blade 13a, whereby the life of the crushing blade 13a and the stationary blade 14 increases by leaps and bounds, and thus the replacing frequency decreases to improve significantly the maintainability. Although in this embodiment, the cemented carbide materials 14s and 13s are embedded in both the stationary blade 14 and the crushing blade 13a, the cemented carbide material is not necessarily embedded in both, and may be embedded only in either thereof.

Figure 3:
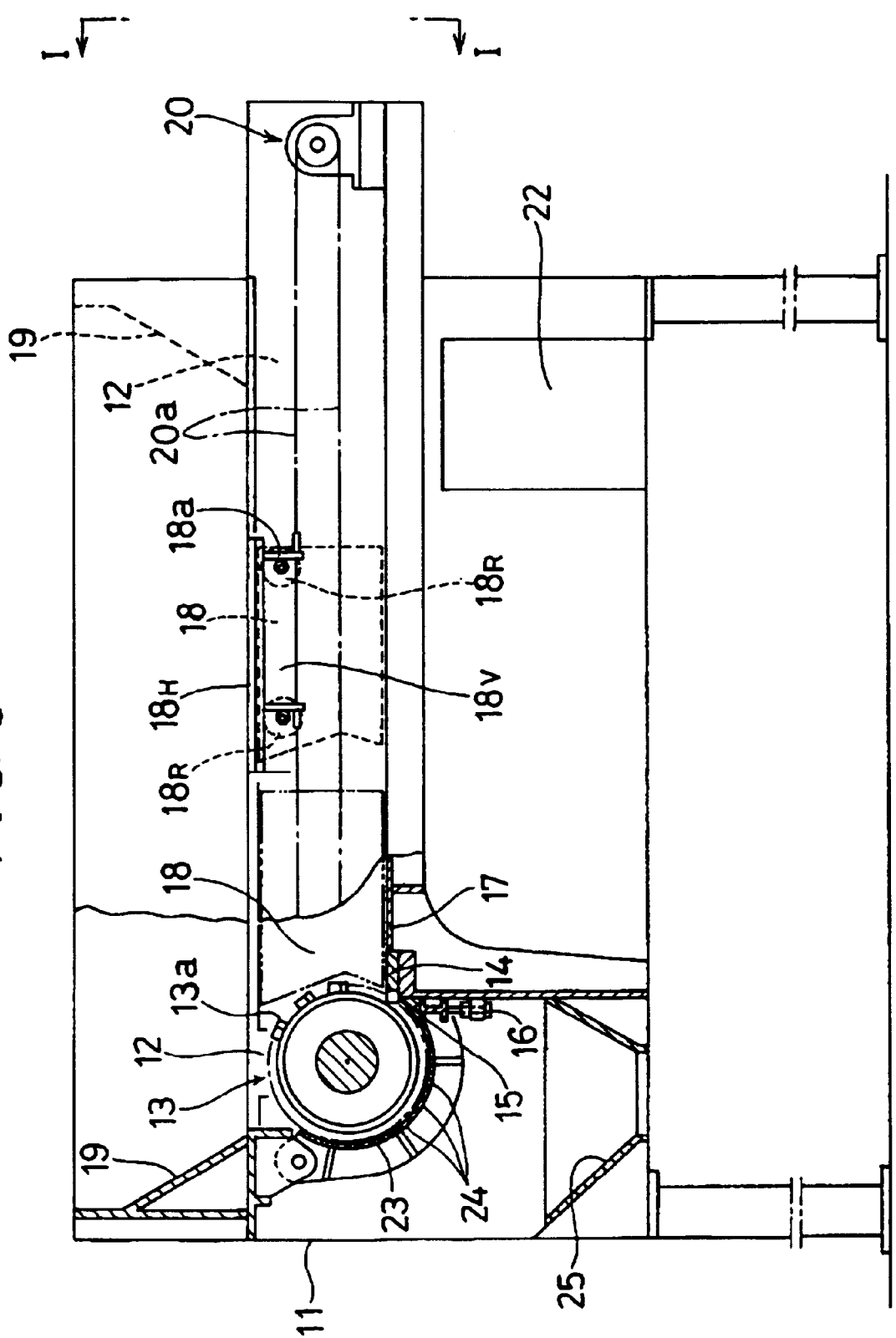
FIG. 3 is a principal-part-enlarged side view including a partly sectional view of the crusher.

Provided on the lower side of the above-mentioned stationary blade 14 in the direction in which the rotation of the crushing rotor 13 proceeds is an anvil 15 of triangle shape in section. As shown in FIG. 3, the anvil 15 is provided on an H shaped anvil supporting member, and provided adjustably in upward/downward position by a threaded bolt 16 threadedly engaged with a nut integral with a block having a hole secured to the frame on the lower side of the supporting member. It is preferable that the anvil 15 is triangular in section and configured such that a plurality thereof are mounted adjacently to each other and the crushing blade 13a is inserted through the groove formed by the adjacent anvils 15.

Figure 7:
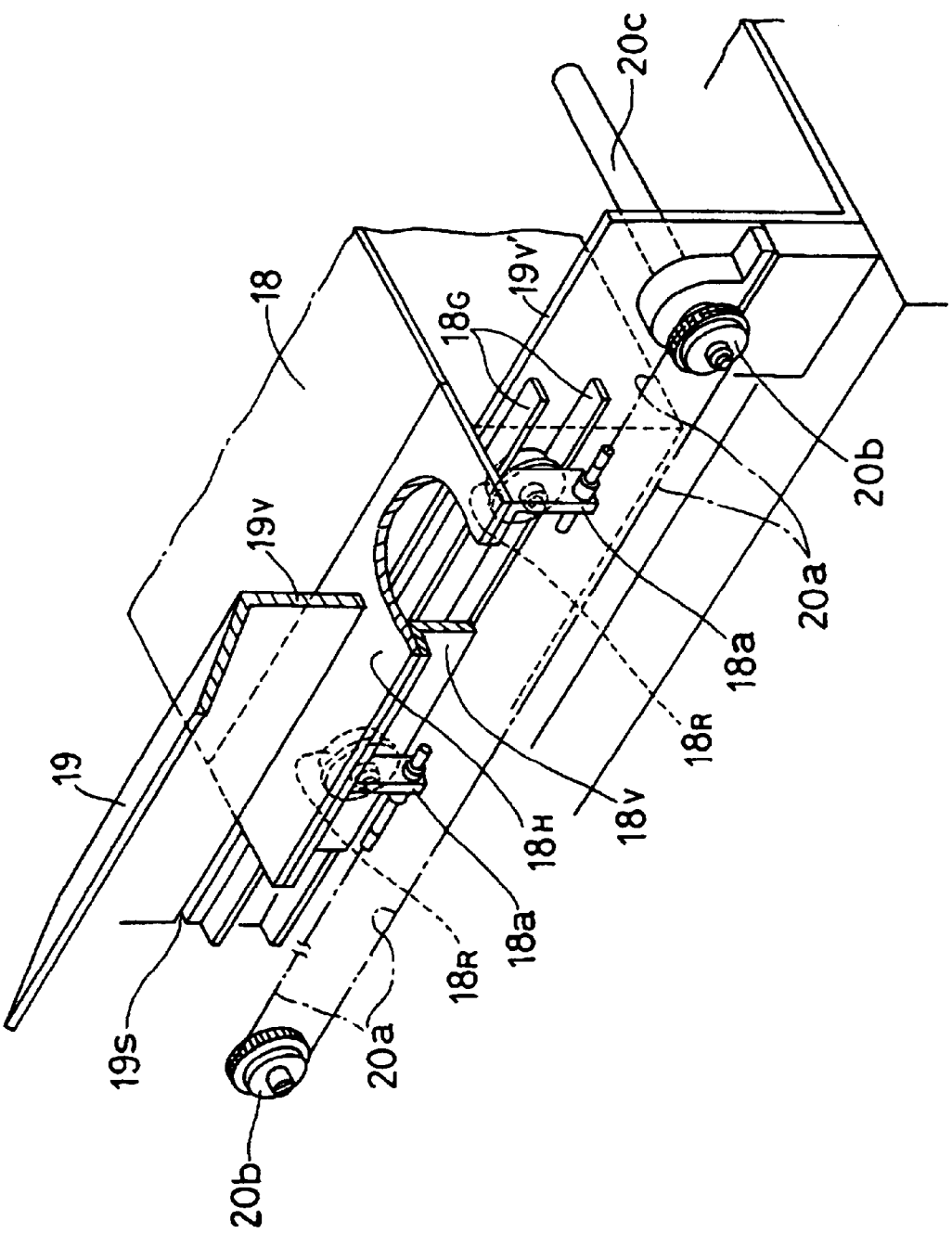
FIG. 7 is a partly perspective view of a pusher of the crusher.

Provided on the supporting bed 17 is a box-shaped pusher 18 forward/backward moving slidably. As shown in FIG. 7, provided on the outward both sides are wing plates 18H, which protrude outward beyond a clearance 19s provided by cutting midway a vertical plate 19v on the outward side of the hopper 19. In FIG. 7, the wall on the backward side of the hopper 19 is not shown.

Mounted to the above-mentioned wing plate 18H and a vertical plate 18v mounted thereto are chain lockers 18a and guide rollers 18R at two places in appropriate intervals. The guide roller 18R is guided between guide rails 18G provided on the outer face of the vertical plate 19v of the hopper 19. Locked to the chain locker 18a is a chain 20a in a semiendless relation, and the chain 20a is driven by chain wheels 20b on both sides, thereby allowing the pusher to be moved forward/backward.

Figure 8:
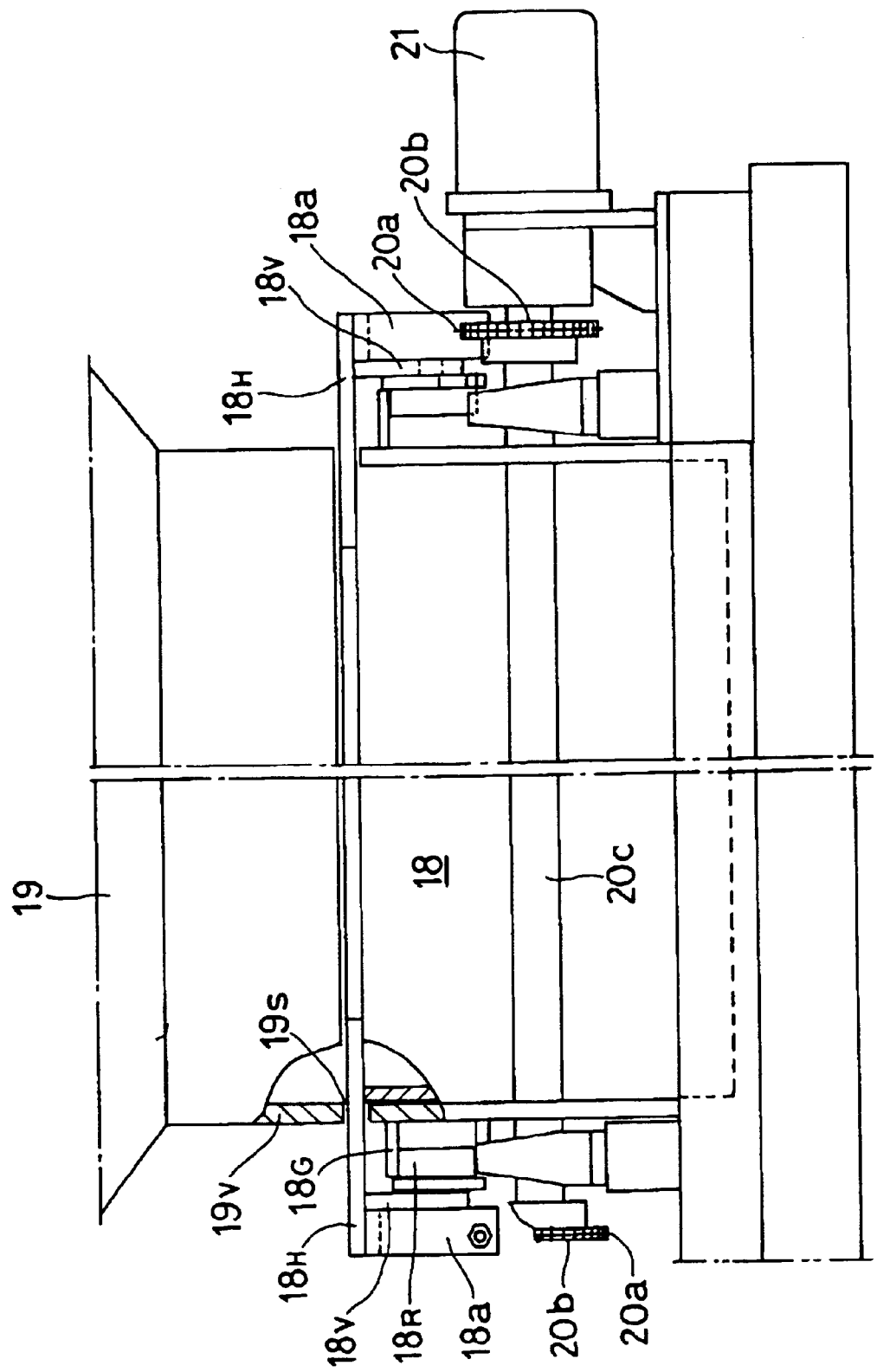
FIG. 8 is a view taken along a line I—I of FIG. 3.

Also, as shown in FIG. 8, the above-mentioned chain 20a and chain wheel 20b are installed right and left, coupled through a coupling shaft 20c, and rotationally driven in the normal and reverse direction by a hydraulic motor 21 connected to the coupling shaft 20c, whereby a drive part 20 is configured. By coupling the right/left chain wheels 20b through the coupling shaft 20c, the driving of the right/left chains is made completely synchronized. The hydraulic pressure for the hydraulic motor 21 is supplied from a hydraulic source (see FIG. 3) on the lower side of the supporting bed 17.

Although the pusher driving system as described above is applied to a case where the hopper length is large and the storage capacity is attempted to increase, or to a case where lengthy crushed material is mainly processed, when a relatively small hopper capacity for normal waste is acceptable, a method may be employed with which a hydraulic cylinder is provided on a supporting plate and connected with a cylinder coupling bracket provided at the pusher end to drive the pusher.

Further, now back to FIGS. 3 and 4, explaining the peripheral configuration of the above-mentioned crushing rotor 13, provided on the lower side of the crushing rotor 13 is a perforated plate-type grate 23 along substantially the semicircular of the rotor. By making the size of small holes 24 of the grate 23 an appropriate value, the size of crushed pieces can be made constant to some extent. Now the small holes 24 of the grate 23 are bored into, for example, a square shape with a side 50 mm.

Also, provided on the further lower side of the above-mentioned grate 23 is a small hopper 25 as a discharging port. The crushed pieces discharged from the discharging port are placed on the above-mentioned discharging conveyor C1.

As shown in FIG. 4, the crushing rotor 13 is of a substantially cylindrical and drum shape as a whole, and configured such that shaft portions 13b protruded from both ends thereof are rotatably supported through a bearing by the frame, and the shaft portion on one end thereof is connected with the output shaft of a reducer 26, whereby the power of a motor 28 is transmitted through a pulley 27 connected to the input shaft of the reducer 26.

Figure 9:
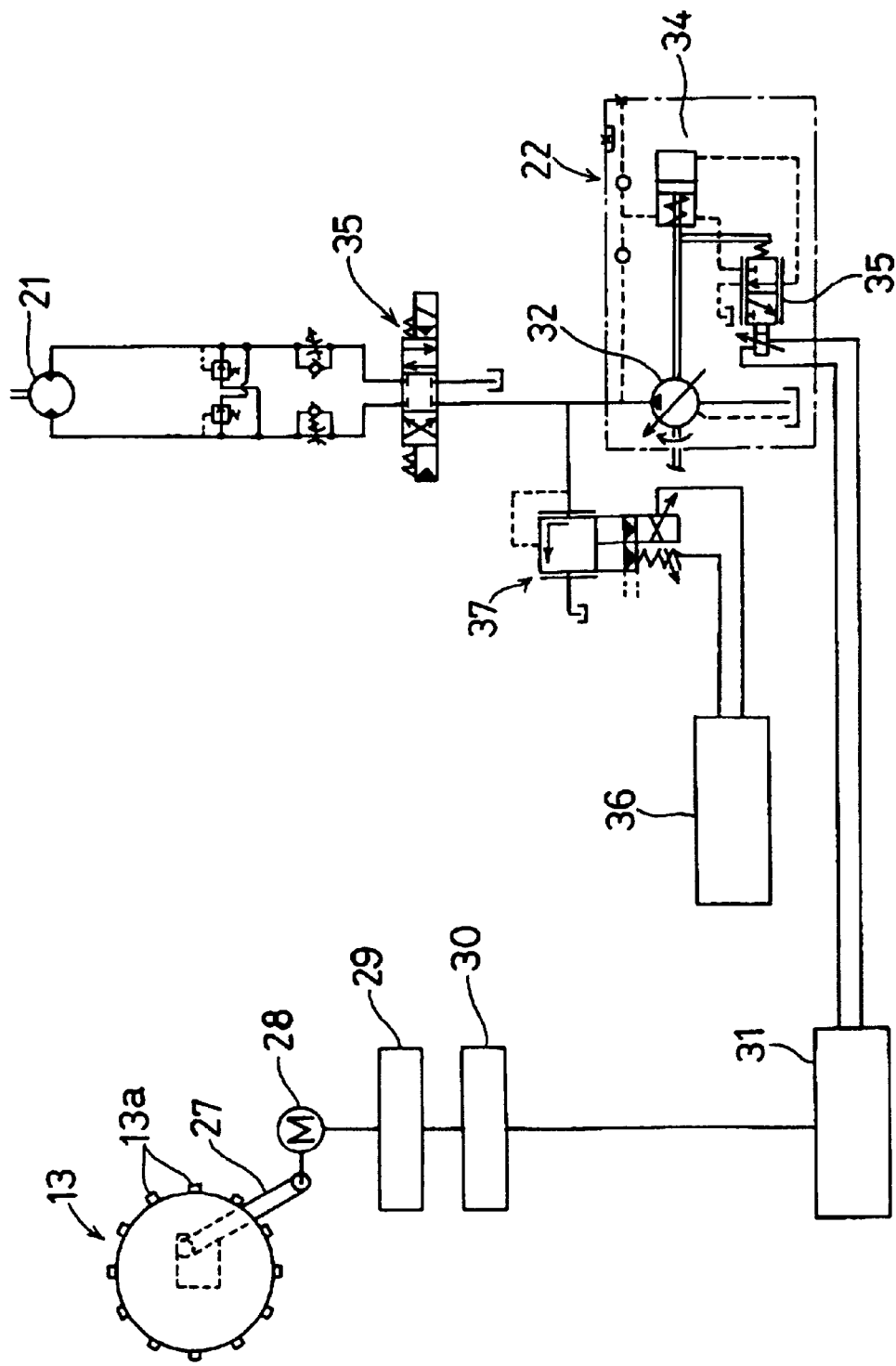
FIG. 9 is a block diagram of a hydraulic circuit of the crusher.
Figure 10:
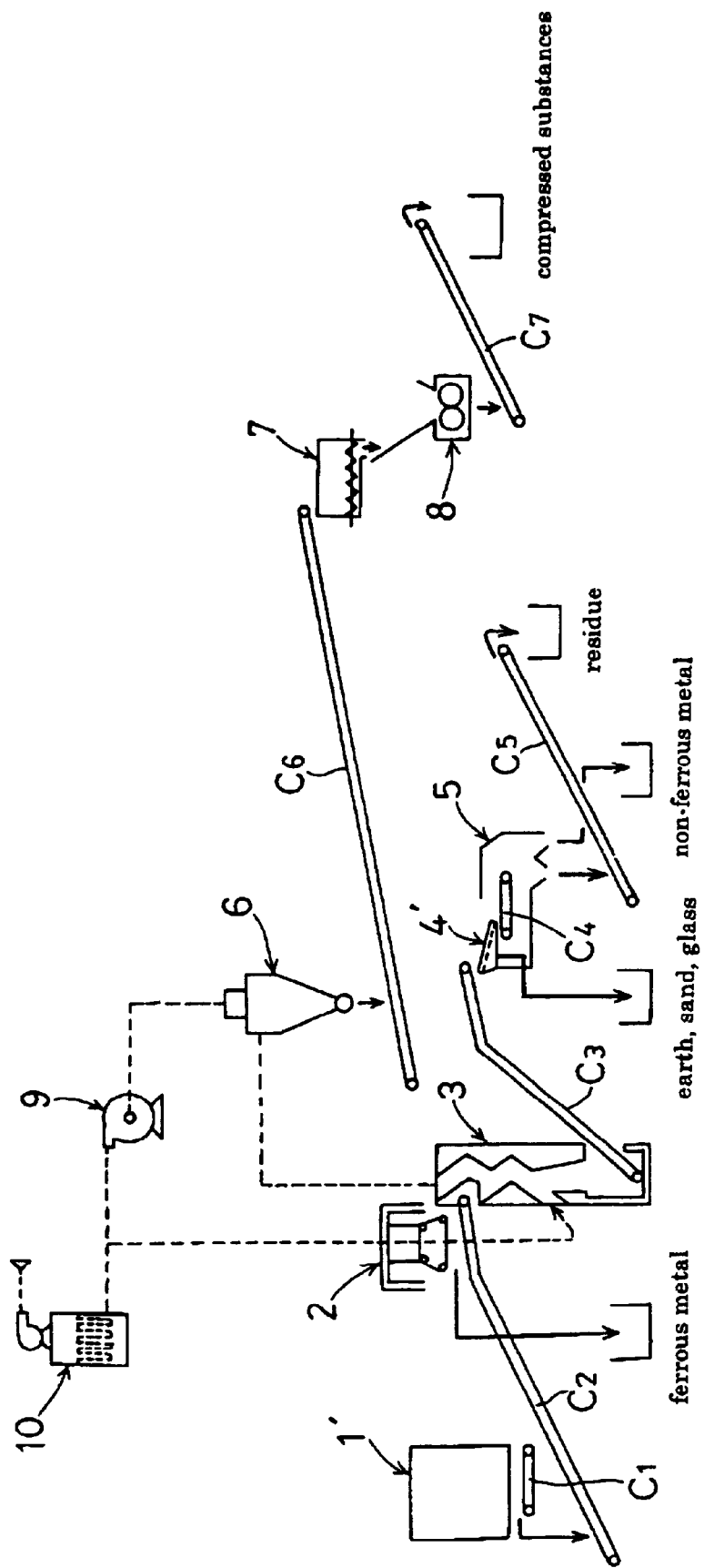
FIG. 10 is a general schematic view showing a conventional system for processing big refuse.

In the above-mentioned embodiment, there is provided a control circuit, as shown in FIG. 9, which can perform automatically the pusher speed adjustment according to the strength of big refuses.

In this control circuit, the hydraulic motor 21 rotationally driving the chain wheel 20b engaged with the endless chain 20a for forward/backward moving the pusher 18 is connected to a hydraulic pump 32 of the hydraulic source 22, and an electromagnetic proportional-type flow control valve 33 is incorporated in the hydraulic source 22, whereby the flow control valve 33 is operated to adjust the oil quantity supplied to the hydraulic motor 21, thereby controlling the forward/backward moving speed of the pusher 18.

Connected to the motor 28 for rotationally driving the crushing rotor 13 is a current detector 29 for detecting a change in load current, and the current detector 29 is connected through a servomechanism 30 and a pump discharge control amplifier 31 to the above-mentioned flow control valve 33. The servomechanism 30 is adapted to send an actuating signal with a magnitude reverse proportional to a change in the current value detected by the current detector 29 to the flow control valve 33, in which a servo-valve for receiving the signal from the servomechanism 30 and adjusting the oil quantity passing through the control valve is incorporated.

In the above-mentioned structure, during crushing, a current value of the motor 28 is measured, then the servo-valve of the flow control valve 33 is controlled by the servomechanism 30 so as to make the signal reverse proportional to a change in the current value, thereby adjusting the oil quantity supplied to the hydraulic motor 21 for driving the pusher. With this structure, when the crushing load in the crushing rotor 13 increases, the oil quantity supplied to the hydraulic motor 21 becomes smaller to cause the big refuse feeding quantity to the crushing position by the pusher 18 to be decreased, and on the contrary, when the load of the crushing rotor 13 decreases, the big refuse feeding quantity by the pusher 18 increases to cause the quantity crushed by the crushing rotor 13 to be increased, thereby allowing an efficient crushing work to be continued by automatic operation.

Further, it is also possible as a simple way for the above-mentioned servomechanism to detect stepwise the load condition of the crushing rotor to make the pusher speed reverse proportional to the detected value.

Also, in order to adjust the crushed particle size, a remotely operated pressure adjusting valve 37 may be provided on the above-mentioned hydraulic system so as to change the urging force of the pusher 18 urging big refuses against the crushing rotor 13, whereby increasing the pressure by remotely pressure adjustment through a pusher urging force control amplifier 36 causes the particle size to be increased, while a decreasing the pressure causes the particle size to be decreased.

The processing system of this embodiment is configured as described above, and the operation thereof will be explained hereinafter.

When processing big refuses consisting of mattresses containing coil springs, big refuses are allowed to be placed on the charging conveyor C0 and charged onto the supporting bed 17 in the crusher 1 from the hopper 19. At this point, with the pusher 18 shifted generally to the hydraulic motor 21 side, the pusher is allowed to move little by little according to the size of the charged big refuses to control the position of the pusher 18 in a manner to correspond to the size of respective big refuse. From this condition, big refuses are pushed by the pusher 18 to be fed toward the crushing rotor 13, and fed into the crushing position between the crushing rotor 13 and the stationary blade 14 while being pushed against the surface of the crushing rotor 13 by the pusher 18. Big refuses fed to the crushing position are partially sheared and crushed by the shearing action between respective crushing blade 13a mounted on the crushing rotor 13 and the stationary blade 14. In this way, there are provided urging/feeding means including the box type pusher 18 for urging big refuses and the drive unit for moving the pusher 18 forward/backward through the endless chain, so that big refuses are pushed by the box type pusher 18 toward the crushing rotor 13, and the portion pushed against the crushing rotor 13 is sequentially crushed.

The crushed pieces are further secondary crushed between the anvil 15 provided on the lower side of the stationary blade 14 and the crushing blade 13a, so that the crushing with uniform particle size is performed. In this way, the material primary crushed by the crushing blade 13a and the stationary blade 14 can be secondary crushed between the crushing blade 13a and the anvil 15, thereby allowing the crushing with a more uniform particle size than by a conventional single axial crusher.

Finely crushed pieces pass through the holes of grate 23 to be dropped downward and discharged from the discharging port, while crushed pieces larger than the hole size of the grate 23 are crushed again, and when crushed into a size smaller than the hole size of the grate 23, they are dropped downward.

Now, when the processing capacity of the crusher is attempted to increase, the length of the spiral pitch predicted by connecting the top portions of the crushing blade 13a is made short so that the number of the crushing blades 13a mounted to the respective circumferential groove 13v of the crushing rotor 13 becomes plural, thereby increasing the number of the crushing blades acting during one revolution of the crushing rotor. This allows the number of crushings per revolution of the crushing rotor to be increased and thus the crushable volume to be increased.

Also, in the above-mentioned hydraulic circuit, during crushing, a current value of the motor 28 is measured, then the servo-valve of the flow control valve 33 is controlled by the servomechanism 30 according to a change in the current value, thereby adjusting the oil quantity supplied to the hydraulic motor 21 for driving the pusher. With this circuit, when the crushing load in the crushing rotor 13 increases, the oil quantity supplied to the hydraulic motor 21 becomes smaller to cause the big refuse feeding quantity to the crushing position by the pusher 18 to be decreased, and on the contrary, when the load of the crushing rotor 13 decreases, the big refuse feeding quantity by the pusher 18 increases to cause the quantity crushed by the crushing rotor 13 to be increased, thereby allowing an efficient crushing work to be continued by automatic operation. In this way, the crushing rotor 13 is provided with the drive part, and both the control means for detecting the load condition of the drive part and changing the actuation of the above-mentioned pusher drive unit according to the load, and the control means for making the pusher actuation pressure variable are included to make the particle size of crushed substances adjustable, so that by controlling the feed speed of the pusher 18 according to the load in the crushing rotor 13, an appropriate quantity of big refuses match with the load at the crushing position can be fed, thus allowing an efficient operation of the crusher. By providing the control means for making the actuating pressure of the pusher 18 variable, increasing the pressure causes the particle size of crushed subjects to become large, while decreasing the pressure causes the particle size to become small, so that such control means are effective when adjusting the particle size of crushed subjects.

The circumferential groove 13v are formed of grooves with V-letter shaped section, and the crushing blades 13a are formed of square-pillar shaped blades substantially half of which are fitted into the V-letter shaped circumferential groove 13v, so that the sharp angle portion P of the respective crushing blades 13a initially bites into big refuses, thereby allowing even big refuses with a large strength to be crushed with a relatively small force. In addition, the square-pillar shaped crushing blades 13a are fitted by substantially half thereof into the V-letter shaped circumferential groove 13v to mount, so that the dislocation in the lateral direction (in the axial direction of the crushing rotor 13) of the crushing blade 13a hardly occurs, thereby allowing the crushing blade 13a to be securely mounted to the crushing rotor 13. Further, even when the corner portion P of the crushing blade 13a wears, the crushing blade 13a is allowed to be disengaged from the crushing rotor 13, and the other corner portion is to be mounted in a manner to protrude from the crushing rotor 13, thereby allowing the new corner portion to be used.

Particularly, the cemented carbide material 13s is embedded in the four corners on the surface and in the four corners on the back at eight places in total so that the crusher has an advantage in that even using any corner allows the effect by the cemented carbide material 13s to be obtained.

Also, the above-mentioned crusher 1 has the hopper 9 on the upper side, and is of small size as a whole, so that it is easily placed on a vehicle and the whole system is placed on a vehicle as described above, and thus the crusher has an advantage in that it can be moved to a destination requiring processing at which the above-mentioned processing work can be performed.

Particularly, the above-mentioned crusher 1 is suitable for crushing spring-containing mattresses having coil shaped springs inside thereof such that in crushing such spring-containing mattresses, most of springs can be crushed into short and straightway extended ones to make the following grading work of metallic content and fibers content extremely simple, and springs in a straightly extended condition can be cut into 200 mm or less, so that a condition in that springs twin around the blade to make crushing unable as with the biaxial crusher does not occur.

Then, the crushed pieces crushed into a certain size or less as described above are conveyed by the discharging conveyor C1 and the conveying conveyor C2 to the magnetic-force grading process.

In the magnetic-force grading process, iron material is removed from the crushed pieces by the magnetic-force grader, and the other crushed pieces are dropped into the dust chute 4.

Then, the iron material graded by the magnetic-force grader 2 is conveyed to the wind-force grading process, where adhering fiber and the like are removed by the wind-force grader 3.

This allows light-weight refuses including cloth, cotton, sponge and the like, and the iron material such as springs to be classified and collected, so that thereafter there is a low possibility of including impurities other than iron material when melting the collected iron material.

What is claimed is:

1. A single axial crusher comprising a crushing chamber into which large refuse is charged, a rotatable crushing rotor provided in the crushing chamber having a substantially cylindrical shape as a whole and on which a plurality of circumferential grooves are formed parallel and in spaced relationship to each other along a circumferential direction on an outer peripheral surface of the rotor, a plurality of crushing blades mounted detachably to the circumferential grooves of the crushing rotor, a stationary blade fixedly secured to the inside of the crushing chamber and arranged opposite to respective circumferential grooves in a manner to be inserted through the crushing blades, an anvil for secondary crushing fixedly secured to the side at which the rotation of the crushing rotor proceeds rather than to the stationary blade, and urging/feeding means for urging/feeding large refuse in the crushing chamber toward the crushing rotor.

2. A single axial crusher as set forth in claim 1, wherein a cemented carbide material is embedded in at least one of the blade portions of the groove blades of said crushing blade and the blade portion of said stationary blade.

3. A single axial crusher as set forth in claim 1, wherein said circumferential grooves are formed of grooves of V-shaped section, and said crushing blades are formed of square-pillar shaped blades, substantially half of each of which is fitted into the V-shaped grooves.

4. A single axial crusher as set forth in claim 3, wherein said crushing blade has four corners and cemented carbide materials are embedded in the four corners of the surface and back of said crushing blade.

5. A single axial crusher as set forth in claim 3, wherein said stationary blade is formed from a plurality of V-shaped grooved blades, provided continuously in serration.

6. A single axial crusher as set forth in claim 5, wherein said crushing blades are disposed in a manner to be shifted in phase in the circumferential direction between adjacent circumferential grooves so that the phase of said crushing blades is shifted in such a manner that an imaginary line connecting the crushing blades becomes spiral.

7. A single axial crusher as set forth in claim 6, wherein the spiral imaginary line of said crushing blades is variable according to a value of the shifted phase of said crushing blades with respect to the circumferential direction.

8. A single axial crusher as set forth in claim 1, wherein said urging/feeding means comprise a box-type pusher for urging large refuse and a drive unit for moving the pusher forward/backward through an endless chain.

9. A single axial crusher as set forth in claim 8, wherein said crushing rotor is provided with a drive part and control means for detecting a load condition of the drive part and changing the actuation of said drive unit of the pusher according to the load, and control means for making the pusher actuating pressure variable, thereby causing the particle size of the crushed pieces to be adjusted.

* * * * *